Patented June 27, 1933

1,915,431

UNITED STATES PATENT OFFICE

KARL LUDWIG LAUTENSCHLÄGER, OF FRANKFORT-ON-THE-MAIN, MAX BOCKMÜHL AND GUSTAV EHRHART, OF FRANKFORT-ON-THE-MAIN-HOCHST, AND WALTER KROHS, OF BAD-SODEN, GERMANY, ASSIGNORS TO I. G. FARBENINDUSTRIE AKTIEN-GESELLSCHAFT, OF FRANKFORT-ON-THE-MAIN, GERMANY, A CORPORATION OF GERMANY

PROCESS OF HYDROGENATING POLYHYDROXY COMPOUNDS AND SUBSTANCES OBTAINABLE THEREBY

No Drawing. Application filed October 20, 1928, Serial No. 313,939, and in Germany October 24, 1927.

The present invention relates to a process of hydrogenating polyhydroxy compounds and to new substances obtainable thereby; more particularly it relates to a process which comprises treating polyhydroxy compounds with catalytically activated hydrogen under superatmospheric pressure and at a temperature of between about 200° C. and about 300° C. The products obtained are valuable in many respects.

The hydrogenation-process can be applied in a general manner. By the term "polyhydroxy compounds" are to be understood poly-hydroxylated hydrocarbons of the acyclic and cyclic series, for instance polyalcohols, such as glycerine, erythrites, pentites, hexites, heptites, furthermore carbohydrates, such as trioses, tetroses, pentoses, hexoses, also di-saccharides, polysaccharides, glucosides and quinite. Besides the polyhydroxy compounds themselves there may also be employed the derivatives thereof, for instance their alkylated and acetonated products; furthermore polyhydroxy acids, such as for instance gluconic acid or the like, with the exception of aromatic polyhydroxy compounds.

In this manner there is, for instance, obtained from glycerine the 1.2-dihydroxypropane with a good yield. Thus, a hydroxymethyl-group, standing in end-position, has been transformed into a methyl-group. Besides, there may however occur even more radical alterations. If, for instance, glucose is subjected to the herein described process, the reduction first leads, as already known, to the corresponding hexite. But in this phase the carbon chain is symmetrically broken up and glycerine is formed. Of course, there can again be produced 1.2-dihydroxypropane by further reducing the glycerine. In an analogous manner and with the same result other carbohydrates can be transformed into glycerine.

As under certain conditions the yields of glycerine are excellent it may be asserted that the value of the new process is at least equal to the older methods. The same substance is of course obtained if one starts from the corresponding alcohols, the hexites, instead of from the carbohydrates.

As catalysts may be employed metals or metal compounds of the iron-group or those of the platinum-group or copper. The above named catalysts may be employed alone or in mixture.

The resulting reaction products are intended to be employed for various purposes especially for technical purposes, for instance as lubricant and thickening agent, and as starting material for medicinal substances etc.

Examples (1) 180 g of glycerine are treated with hydrogen in a bomb at a temperature of between 200° C. and 240° C. and under a pressure of 100 atmospheres while using 15 g of a Ni-catalyst. After 4 hours the calculated quantity of hydrogen is absorbed. After the catalyst is filtered off by suction and the filtrate is distilled, the greater part is distilling over as dihydroxypropane of the boiling point 187° C. and 188° C.

(2) 75 g of sorbite are dissolved in the same quantity of water and the solution is heated, for instance, with 7 g of a Ni-catalyst to a temperature of between 200° C. and 250° C. By the treatment with hydrogen under a pressure of between 70 and 100 atmospheres the hydrogen is extensively absorbed. After the water has been distilled off, dihydroxypropane of the boiling point 186° C.–188° C. and glycerine of the boiling point 290° C. are obtained. If the absorption of hydrogen is interrupted at an early stage, the glycerine is obtained as the principal product.

(3) 100 g of dextrose, dissolved in 100 g of water, are heated with hydrogen to a temperature of 150° C. in the presence of 10 g of a Ni-catalyst first at a pressure of 40 atmospheres. By this working method the corresponding alcohol is formed which, after raising the temperature and increasing the pressure continues to absorb hydrogen and is decomposed into glycerine and dihydroxypropane or into glycerine as principal product according to the amount of hydrogen absorbed, as described in Example 2.

(4) 100 g of cane sugar, dissolved in 100 ccm. of water, are treated with hydrogen in the presence of 10 g of a Ni-catalyst as indicated in Example 3. Also in this case the initial absorption of hydrogen is effected at a pressure of 40 atmospheres and at a temperature of 150° C. while the subsequent hydrogenation into dihydroxypropane and glycerine or glycerine substantially alone is carried out as indicated in Example 2.

(5) 100 g of starch, dissolved in 100 ccm. of water, are heated with hydrogen at a temperature of between 210° C. and 250° C. and under a pressure of between 70 and 100 atmospheres while using 10 g of a Ni-catalyst. When the absorption of hydrogen is complete the mass is worked up as described in Example 2 whereby dihydroxypropane and glycerine are obtained, or, if the supply of hydrogen is interrupted at a certain moment, glycerine as principal product.

(6) 30 g of cellulose, suspended in 300 ccm. of water, are heated with hydrogen at a temperature of between 250° C. and 260° C. and under a pressure of between 70 and 100 atmospheres while using 3 g of a Ni-catalyst. After the water has been distilled off, glycerine and dihydroxypropane are obtained.

(7) 50 g of sawdust, suspended in 300 ccm. of water, are treated for about half an hour with hydrogen at a temperature of between 240° C. and 260° C. and under a pressure of between 70 and 100 atmospheres while using 5 g of a Ni-catalyst. After the mass has been worked up as indicated in Example 2 dihydroxypropane and glycerine are obtained. The aqueous distillate contains moreover isopropyl alcohol.

(8) 50 g of sawdust are suspended in 400 g of water and heated for half an hour with hydrogen at a temperature of 220° C. and under a pressure of between 70 and 100 atmospheres while using 5 g of a Ni-catalyst. After cooling the catalyst is filtered off by suction and the water removed by distillation in vacuo. The residue solidifies into a crystalline mass, is re-dissolved from alcohol and yields 7.5 g of mannite having its melting point at 166° C. The resulting lyes can be worked up into glycerine by a further hydrogenation.

(9) 50 g of straw are treated in 400 g of water under a pressure of between 70 and 100 atmospheres and at a temperature of between 230° C. and 250° C. while using 5 g of a Ni-catalyst. After the water has been distilled off in vacuo, dihydroxypropane and glycerine are obtained.

(10) 50 g of peat, suspended in 400 g of water, are treated for half an hour with hydrogen at a temperature of between 230° C. and 250° C. and under a pressure of between 70 and 100 atmospheres while using 5 g of a Ni-catalyst. After the water has been removed by filtration and distillation there is obtained besides the products obtained in the previous examples a strongly saccharine sirup.

(11) 50 g of cellulose in 200 g of water are heated with hydrogen at a temperature of 230° C. and under a pressure of between 70 and 100 atmospheres while using 5 g of a nickel-oxide-catalyst. After the product has been further treated as in previous examples there are, also in this case, obtained dihydroxypropane and glycerine.

(12) 50 g of sawdust, suspended in 400 g of water, are treated with hydrogen at a temperature of between 230° C. and 250° C. and under a pressure of between 70 and 100 atmospheres while using 5 g of a catalyst, containing the metals nickel, cobalt and copper in the proportion of 20:6:1. By working up the mass as in previous examples, dihydroxypropane and glycerine are obtained.

(13) 50 g of sawdust in 400 g of water are treated with hydrogen at a temperature of between 230° C. and 240° C. and under a pressure of between 70 and 100° atmospheres while using 5 g of a copper-catalyst. After the mass has been distilled off there is for the most part obtained dihydroxypropane.

(14) 50 g of cellulose are suspended in 200 g of water and heated with hydrogen at a temperature of 230° C. and under a pressure of between 70 and 100 atmospheres while using 5 g of a copper-catalyst.

(15) 50 g of di-methylcellulose in 100 ccm. of water are heated for about 30 minutes with hydrogen at a temperature of between 230° C. and 240° C. while using 1.5 g of a Ni-catalyst. After the water has been distilled off, dimethoxy-trihydroxy-hexane of the boiling point 170° C.-172° C. under 2 mm pressure is obtained.

(16) 50 g of diethyl cellulose in 100 ccm. of water are heated with hydrogen at a temperature of between 230° C. and 240° C. while using 1.5 g of a Ni-catalyst. Thus there is obtained diethoxy-trihydroxy-hexane boiling at 170° C.-175° C. under 1 mm. pressure.

We claim:

1. Dimethoxy-trihydroxy-hexane, a water-soluble, colorless liquid of a sirupy consistency, boiling at a temperature of between 170° C. and 172° C. and under a pressure of 2 mm.

2. Diethoxy-trihydroxy-hexane, a water-soluble, colorless liquid of a sirupy consistency boiling at a temperature of between 170° C. and 175° C. under a pressure of 1 mm.

3. The process which comprises treating aliphatic polyhydroxy compounds in the presence of water with hydrogen under superatmospheric pressure and at a temperature of between about 200° C. and about 300° C. in the presence of a catalyst of the group consisting of the iron group, the platinum group and copper.

4. The process which comprises treating a substance of the group consisting of cellulose and alkylated cellulose in the presence of water with hydrogen under superatmospheric pressure and at a temperature of between about 200° C. and about 300° C. in the presence of a catalyst of the group consisting of the iron group, the platinum group and copper.

5. The process which comprises treating a substance of the group consisting of cellulose and alkylated cellulose in the presence of water with hydrogen under superatmospheric pressure and at a temperature of between about 200° C. and about 300° C. in the presence of a nickel catalyst.

6. The process which comprises treating alkylated cellulose in the presence of water with hydrogen under superatmospheric pressure and at a temperature of between about 200° C. and about 300° C. in the presence of a nickel catalyst.

7. Dialkoxy - trihydroxyhexanes, obtainable by the process according to claim 3, being water-soluble, colorless liquids, possessing properties, which render them suitable for being used as lubricants or thickening agents.

In testimony whereof, we affix our signatures.

KARL LUDWIG LAUTENSCHLÄGER.
MAX BOCKMÜHL.
GUSTAV EHRHART.
WALTER KROHS.